Figure 1:
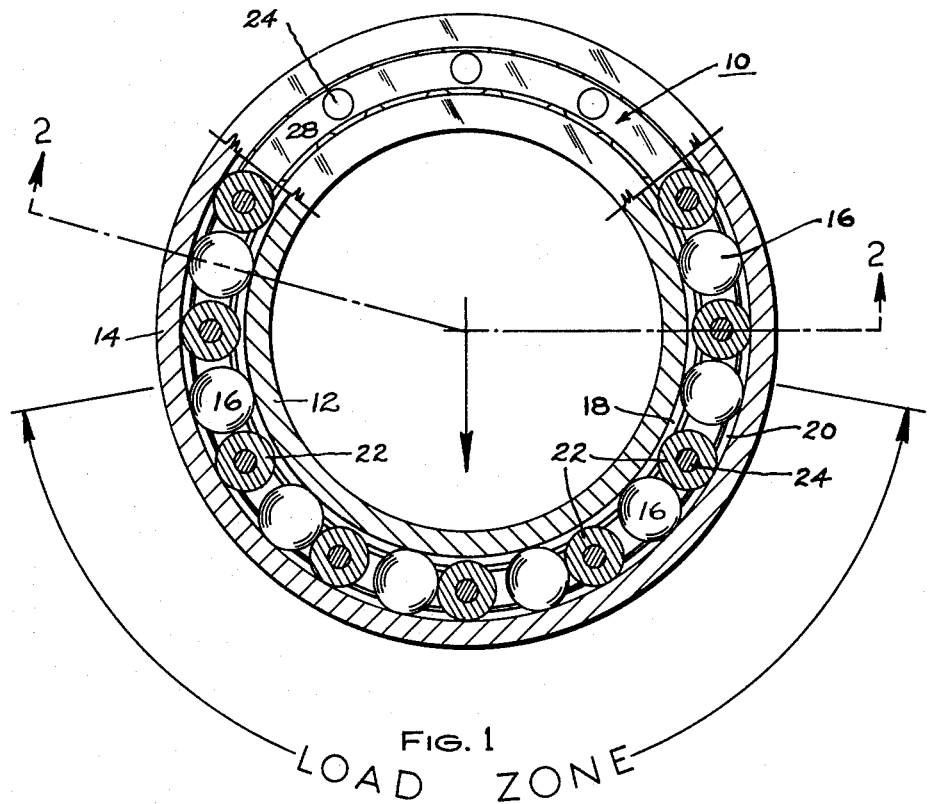

May 9, 1961  W. BLINDER  2,983,559
ANTIFRICTION BEARING
Filed July 23, 1958

INVENTOR
William Blinder
BY: Edward H. Goodrich
HIS ATTORNEY

United States Patent Office 2,983,559
Patented May 9, 1961

2,983,559

ANTIFRICTION BEARING

William Blinder, Newington, Conn., assignor to General Motors Corporation, Detroit, Mich., a corporation of Delaware Filed July 23, 1958, Ser. No. 750,370
3 Claims. (Cl. 308—200)

This invention relates to antifriction bearings and particularly to an improved separator or cage for spacing the rolling elements in an antifriction bearing.

It is usual practice to circumferentially space the rolling elements as balls or rollers in an antifriction bearing by an annular separator or cage having a series of circumferentially spaced pockets which individually receive the rolling elements and guide them during operation of the bearing. With this arrangement, even in the presence of suitable bearing lubricant there is a frictional loss and heating of the bearing due to the slidable engagement of the rolling elements against the side walls of their guiding pockets. Also, in many separators, there is an objectionable frictional engagement between the separator and one of the race rings. Furthermore, in many antifriction bearings and particularly in antifriction bearings which support non-uniformly distributed loads, the rolling elements individually change their rates of movements when entering and when leaving this loaded zone of the bearing. This change in circumferential rate of rolling element travel creates further friction between the rolling elements and the separator and is detrimental to the normal antifrictional characteristics of the bearing. With present demands for extremely high speed precision antifriction bearings which in many instances have to operate under conditions of high temperature and/or marginal lubrication, the added friction of the separator against the rolling elements and in some instances against a race ring, frequently cause excess heating of the bearing and galling or metal transfer to the balls and race rings which greatly shortens bearing life.

It is, therefore, an object of this invention to provide an improved antifriction bearing separator wherein the rolling elements may change their rates of movement within the separator.

It is another object of this invention to provide an improved separator construction for an antifriction bearing wherein the rolling elements are antifrictionally engaged by the separator during operation of the bearing.

It is a further object of this invention to provide an improved separator for an antifriction bearing and wherein separator guided rolling elements are free to change their rates of movement into and out of loaded zones in the bearing.

It is a further object of this invention to provide an improved separator for an antifriction bearing and wherein the rolling elements are antifrictionally spaced from each other during their rolling movement within a bearing.

It is a still further object of my invention to provide an improved separator embodying rolling elements having self-lubricating and/or non-galling characteristics.

To these ends and also to improve generally upon devices of this character, the invention consists in the various matters hereinafter described and claimed. In its broader aspects, the invention is not necessarily limited to the specific structure selected for illustrative purposes in the accompanying drawings wherein Figure 1 is a fragmentary end elevation of an antifriction bearing embodying my improved separator; and Figure 2 is a sectional view taken along the line 2—2 of Figure 1.

As shown on the enclosed drawings, my improved separator 10 is located in the annular space between a pair of inner and outer race rings 12 and 14 which are positioned in relatively rotatable coaxial relation through a series of circumferentially spaced rolling elements, as balls 16, that rollingly engage within annular raceways 18 and 20 on the inner and outer race rings. Alternating with the balls 16 are a series of spacing rollers 22 preferably of spherical contour to antifrictionally roll against one of the raceways. As illustrated, these spacing rollers or balls 22 are in free rolling engagement with the outer raceway 20 but it will be appreciated that these spacing rollers may roll upon either raceway. Each spacing roller 22 is journalled for free rotation upon the intermediate portion of a cross pin 24 having reduced outer ends 26 extending through and secured to a pair of guide rings 28. The intermediate cylindrical portion of each cross pin which extends through a spacing roller 22 preferably exceeds the transverse length of this spacing roller and terminates at the reduced portion 26 in a shoulder against which the guide ring is located, thus providing for free rotation of the spacing rollers between the guide rings without any binding thereagainst. These guide rings and rollers are secured in unit-handling assembly by heading over the ends of the cross pins 24 within guide ring recesses. The rollers 22, which in the present instance are shown as generally spherical to freely roll in one of the raceways, are of slightly lesser diameter than the load-supporting balls 16 of the bearing. The end guide rings 28 which are radially positioned by the cross pins 24 are narrower in radial width than the spacing between the race rings and are preferably located in closely spaced relation to but out of contact with each of the race rings to prevent binding thereagainst and also to aid in maintaining lubricant within the bearing.

Figure 2:
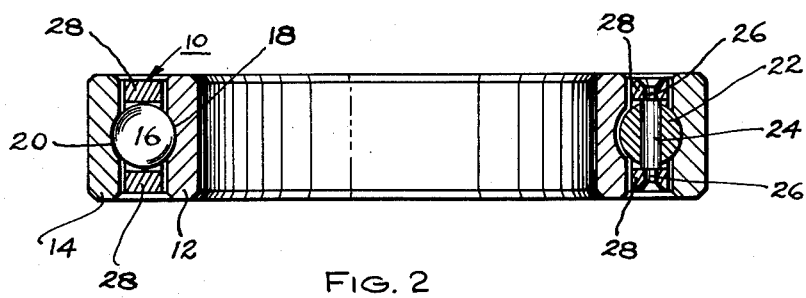

When an antifriction bearing is loaded through an arcuate portion of the bearing as indicated in Figure 1, and which is common practice in the use of such bearing, the rolling elements as the balls 16 enter a slightly narrowing throat as they roll into the loading zone and leave this loading zone through a slightly expanding throat. This condition, which also exists under combined radial and axial thrust loads, causes each rolling element 16 to suddenly increase its rate of rolling as it enters the loading zone, and to individually decrease its rate of rolling as it leaves the other side of the loading zone. In the usual type of separator for an antifriction bearing, the rolling elements are each closely received in a pocket and constrained to move at a uniform circumferential rate during bearing operation. This results in a frictional binding of the rolling elements against the walls of a separator pocket upon entering and leaving the loading zone. Furthermore, this causes a skidding of the balls or rollers against the raceways all of which creates rapid bearing wear and heating of the bearing which usually is accompanied by galling of the raceways and balls thus shortening the bearing life. To overcome this detrimental feature, the adjacent spacing rollers 22 in my separator are preferably circumferentially spaced from each other through a distance considerably exceeding the diameter of the ball or rolling element 16 therebetween. This gives the rolling elements 16 opportunity to individually change their rates of travel upon entering and leaving the loading zone while maintaining a true rolling engagement against both of the raceways 18 and 20. Since the spacing rollers 22 may rollingly advance on one of the race rings under no bearing load, the separator 10 is free to antifrictionally rotate with the result that there is substantially no frictional engagement between the freely movable rollers 22 and the load-carrying rolling elements 16. Consequently, the intermittent engagement of the spherical rolling elements 16 against the adjacent spherical surfaces of the spacing rollers 22 in the presence of suitable lubricant, reduces any friction between these members to an absolute minimum. Since spacing rollers 22 do not carry any bearing load, they may be composed of materials having a very low coefficient of friction in the presence of bearing lubricants and which have antigalling and self-lubricating characteristics even under conditions of marginal lubrication. These spacing rollers may be made from suitable materials such as fiber, molded plastic or other materials having a lubricant affinity. Also, it has been found advantageous in some constructions to employ sintered materials having lubricant-absorbent characteristics. Furthermore, these spacing rollers may also be formed from self-lubricating materials such as certain ceramics, graphite, polytetrafluoroethylene as well as other suitable materials.

I claim:

1. In an antifriction bearing having a plurality of rolling elements for rolling engagement with a pair of coaxial race rings, an annular separator comprising a pair of axially spaced end rings between and radially spaced from both of said race rings, a series of circumferentially arranged spacing balls between the end rings and located for rollingly supported contact against only one of said race rings, said balls circumferentially and loosely guiding the rolling elements in spaced relation to each other, means associated with said balls cooperatively supporting the end rings in unit-handling relation therewith, and each of said balls being of less diameter than that of the rolling elements.

2. In an antifriction bearing having a plurality of circumferentially spaced rolling elements for rolling engagement with a pair of spaced coaxial race rings, an annular separator for circumferentially spacing the rolling elements and comprising a pair of coaxial spaced end rings in radially spacing relation to both of the race rings, spaced rollers in circumferentially spaced relation between the end rings and in alternating relation with the rolling elements, the spacing rollers being of lesser diameter than the rolling elements and rollingly engageable with only one of said race rings in the path of the rolling elements, each pair of adjacent spacing rollers being spaced from each other and circumferentially of the bearing through a distance exceeding the diameter of the intermediate rolling element to provide for free circumferential movement of each rolling element between the adjacent pair of spacing rollers, and cross pins extending between the end rings and rotatably receiving the rollers.

3. In an antifriction bearing having a pair of relatively rotatable race rings respectively provided with annular raceways engaged by a plurality of circumferentially spaced load-carrying balls arranged to roll therein, an annular separator comprising a pair of axially spaced end rings between and in radially spaced relation to both of said race rings, circumferentially arranged spacing balls for circumferentially positioning the load-carrying balls and in alternating relation therewith, each pair of adjacent spacing balls being spaced through a distance exceeding the diameter of the load-carrying ball therebetween, said spacing balls being rotatably engageable with and supported by only one of said raceways, pins connected to the end rings and rotatably receiving the spacing balls in unit-handling relation with said end rings, and said spacing balls having a diameter less than that of the load-carrying balls and having lubricating characteristics for antifrictional engagement with the load-carrying balls.

References Cited in the file of this patent

UNITED STATES PATENTS

| | | |
|---|---|---|
| 847,487 | Maxwell | Mar. 19, 1907 |
| 924,904 | Hess | June 15, 1909 |
| 2,550,911 | Cobb | May 1, 1951 |
| 2,569,531 | Kunzog | Oct. 2, 1951 |
| 2,726,906 | Winchell | Dec. 13, 1955 |

FOREIGN PATENTS

| | | |
|---|---|---|
| 362,512 | France | June 27, 1906 |
| 378,512 | France | Oct. 8, 1907 |
| 3,135 | Great Britain | 1907 |
| 567,556 | Great Britain | Feb. 20, 1945 |
| 453,157 | Canada | Dec. 7, 1948 |
| 314,736 | Switzerland | Aug. 15, 1956 |